June 4, 1940.  E. H. SETTEL ET AL  2,203,368
PHOTOGRAPHIC CAMERA
Filed May 20, 1938  2 Sheets-Sheet 1

INVENTOR
Elmer H. Settel & Vitalis Hrimmer
BY
Morgan Finnegan and Durham
ATTORNEYS

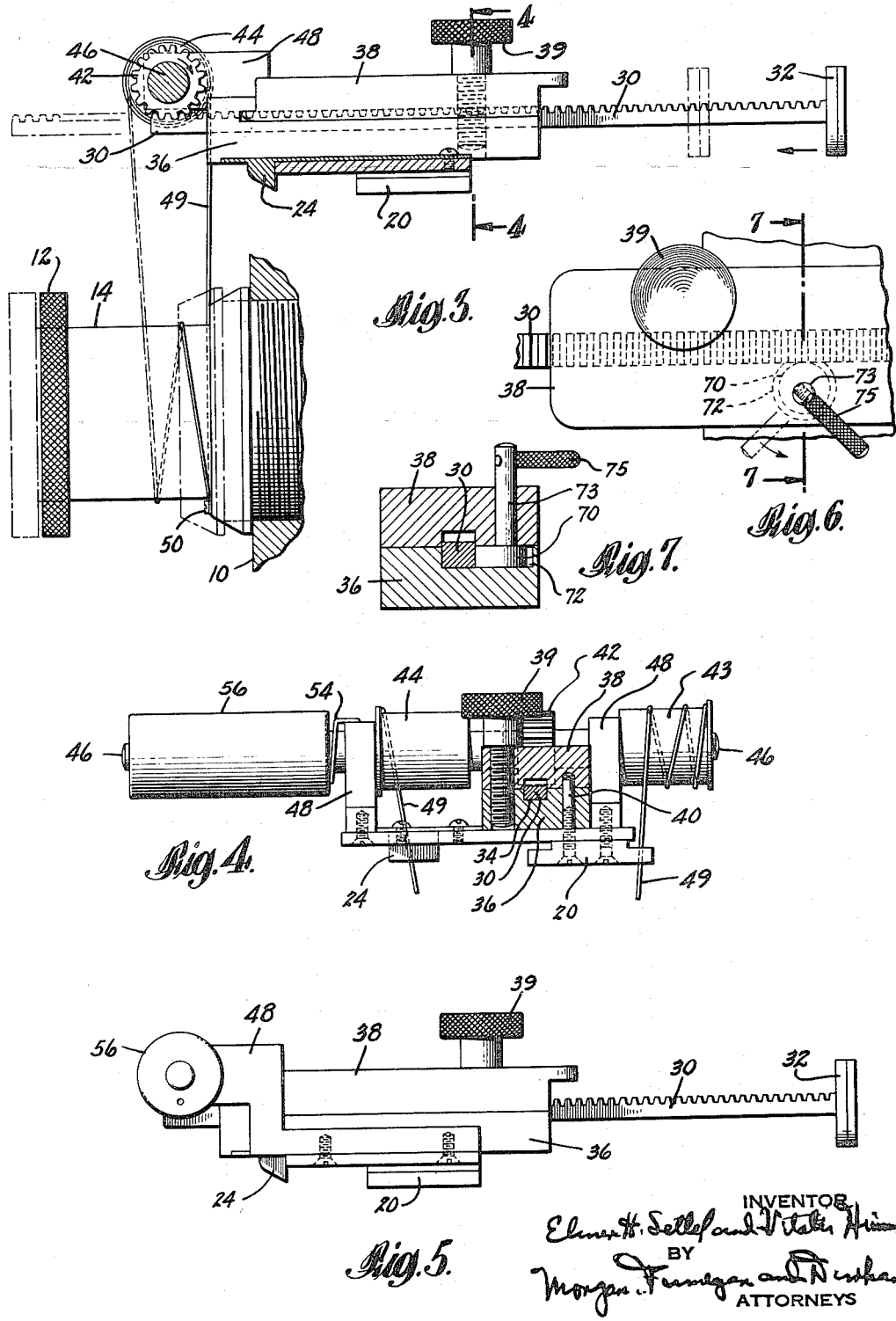

Patented June 4, 1940

2,203,368

UNITED STATES PATENT OFFICE 2,203,368

PHOTOGRAPHIC CAMERA

Elmer H. Settel, New York, N. Y., and Vitalis Himmer, Mountain Lakes, N. J.; said Himmer assignor to said Settel Application May 20, 1938, Serial No. 208,950
In Great Britain September 18, 1937

7 Claims. (Cl. 95—44)

The present invention relates to photographic cameras and more particularly to a novel and improved camera having a focusing lens and coupled range finder.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 3 is a sectional view taken on the line 3—3 of Figure 1;

Figure 4 is a sectional view taken on the line 4—4 of Figure 3;

Figure 5 is a side elevation of the parts shown in Figure 4;

Figure 6 is a fragmentary top plan view of a modified embodiment of the present invention; and Figure 7 is a section taken on the line 7—7 of Figure 6.

Figure 1:
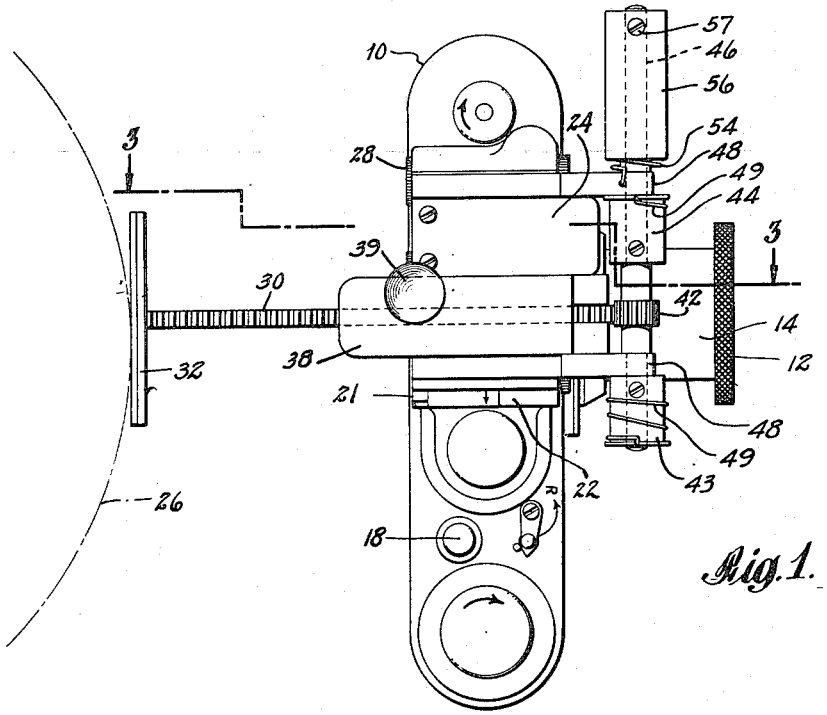
Figure 1 is a top plan view of an illustrative and typical embodiment of the present invention, showing the invention embodied in an attachment device to be used with a conventional type of camera.

The present invention has for its object the provision of a novel and improved photographic camera having a range finder and a common operating means which leave both hands of the user free for holding the camera and releasing the camera shutter. A further object is the provision of a novel and improved coupled range finder camera in which a body engaging member is provided for simultaneously moving the camera and lens while looking through the range finder. The invention also provides a novel and improved small camera which can be easily and quickly manipulated so as to keep its lens constantly focused upon a rapidly moving object at the same time that the operator is constantly ready to make the exposure by holding the camera steady with both hands and releasing the shutter.

The invention may be applied to existing types of cameras or may be incorporated as a part of the mechanism of a novel and improved camera. As embodied, the invention is shown as an attachment to be applied to a conventional type of camera having a focusing lens and coupled range finder. A rearwardly projecting, spring biased member is provided which is preferably adapted to engage the forehead of the user as the user sights through the range finder. This member is illustratively geared to drum means which take up and pay out a flexible cable which rotates the lens in its focusing mount, at the same time variably positioning the range finder, and these movements are accomplished by bodily movement of the camera relative to the user's body. Thus, the user's two hands are free to hold the camera absolutely firm and steady while leaving the fingers for easy operation of the shutter release. In this manner, the camera may be kept continuously focused upon any desired rapidly moving objects while the camera is always held steady and the user is always ready to operate the shutter release when the scene is as desired. Means may be provided for holding the actuating member, lens and range finder when it is desired to use the camera in the conventional manner, or the attachment may be easily detached when not to be used for a series of pictures.

It will be understood that the foregoing general description, and the following detailed description as well, are exemplary and explanatory of the invention but are not restrictive thereof.

Referring now in detail to the illustrative embodiment of the present invention as shown by the accompanying drawing, the range-setting apparatus is shown suitably constructed for and applied to a conventional type of small camera 10 which is provided with a lens 12 in a focusing mount barrel 14 adapted to be focused by rotation of the lens barrel. The camera is also provided with a view and range finder 16 which is coupled in the conventional manner to be moved with the focusing of the lens so that whenever the range finder images coincide, the lens is properly focused. The shutter release 18 is positioned for convenient operation by the right index finger while the camera is firmly grasped with both hands.

The range setting device is shown as an attachment for the conventional camera 10 and is secured thereto by means of the rail 20 which engages in the accessory slide 21 on the top of the camera and is secured thereon by means of the stop 22 and the spring latch 24.

Means are provided for moving the lens 12 and range finder by relative movement of the camera 10 and the user's body preferably through a member which engages a portion of the user's head, such as his forehead 26. At the rear of the camera is the range finder image aperture 28 and extending rearwardly from this is a rack 30 provided at its rearmost portion with an enlargement 32 which can press against the forehead 26.

Rack 30 acts as an operating bar is adapted to be reciprocated and means are provided for rotating the lens 12 by means of this reciprocation. Rack 30 is slidable in a channel 34 formed in the attachment base plate 36 and the rack is secured therein by means of the retaining plate 38 held thereon by thumb screw 39 and in alinement by pins 40. At its forward end, rack 30 engages and meshes with pinion 42 which together with drums 43 and 44 are rotatably mounted by means of the shaft 46 in the forward arms 48 extending from the base plate and overhanging the front of the camera. A flexible cord or cable 49 is wrapped around the lens barrel 14 and is fixed thereto by pin 50, and one end of the cord 49 is wrapped around and secured to drum 43 while the other end is secured to the drum 44, the windings of the cord on the drums being in opposite directions so that one is paid out as the other is taken up. Sufficient stroke of the rack 30 is provided so that the full movement of the lens and range finder may be had.

For opposing movement of the rack 30, lens 12 and range finder 16, and for returning them to a normal position, such as infinity focus, a coil spring 54 is wound around one end of the shaft 46 and one end of the spring 54 is secured to an arm 48 while the other end is held by sleeve 56 which is fastened to the shaft 46, with the spring under tension by means of the set screw 57, and the tension of the spring may be varied thereby to suit the individual and to assure return of the focusing mount and range finder to their original position.

Figure 2:
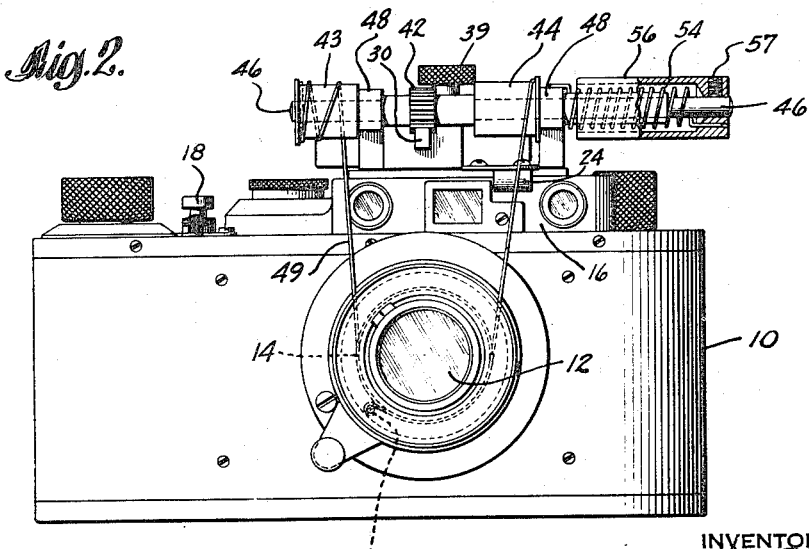
Figure 2 is a front elevation of the embodiment shown in Figure 1.

In using the embodiment of Figures 1 to 5, the aperture and shutter speed are set in the usual manner and the shutter is wound ready to be released by release button 18. The user then raises the camera so that he may see through aperture 28 and thereby gauge when the lens focus is correct. In this position, the enlargement 32 engages his forehead 26 and while looking through the range finder aperture 28 and holding the camera steady with both hands and with the right index finger on the shutter release button 18, the user may continuously follow the object to be focused, even while its range is rapidly changing, and by bodily moving the camera against his forehead, steady it and at the same time keep the object in proper focus without removing his hands from the camera. In this way, the necessity of focusing intermittently is avoided and the camera may be kept ready for exposure at any instant.

When not in use, the rack 30 may be removed by unscrewing the thumb nut 39 and lifting the rack out of place.

Figures 6 and 7 illustrate an additional feature which may be employed in conjunction with the embodiment of Figures 1 to 5. As embodied, means are provided for locking the lens in focused position while the attachment remains in place. An eccentric 70 is seated in a recess 72 in the base plate and is rotatably mounted by shaft 73 journalled in the cover plate 38. Shaft 73 and eccentric 70 may be turned by handle 75 and may thus be moved into and out of rack-engaging position. When tightened against the rack 30, the eccentric holds the rack 30, lens 12 and range finder in any desired position once the correct focus has been obtained.

The invention in its broader aspects is not limited to the specific mechanisms shown and described but departures may be made therefrom within the scope of the accompanying claims without departing from the principles of the invention and without sacrificing its chief advantages.

What we claim is:

1. In a camera, the combination of a focusing lens, a coupled range finder, a rearwardly projecting member, carried by and movable relative to the camera and engageable with a portion of the user's body as he views the subject through the range finder, a spring opposing such movement of the member and means connecting the member with the lens for focusing movement of the lens and range finder by relative movement of the member.

2. In a camera, the combination of a focusing lens, a coupled range finder, an operating bar on the camera, moveable in one direction with respect to the camera by engagement with a portion of the user's body, means for moving the operating bar in the opposite direction, a drum connected with the lens for focusing the lens and varying the range finder and means interconnecting the drum and operating bar for rotating the drum as the operating bar is moved relatively to the camera.

3. In a camera, the combination of a focusing lens, a range finder, a rearwardly projecting operating bar movably mounted on the camera and operated in one direction by bodily movement of the camera against a portion of the body while the user is viewing the subject through the range finder, said operating bar being connected with the range finder and lens for simultaneously adjusting the focus of the lens and the setting of the range finder whereby the fingers are left free for grasping the camera and operating the shutter release, and means for moving the operating bar in the opposite direction.

4. In a camera, the combination of a focusing lens, a range finder, means movably mounted on the camera and engageable against the user's forehead operated in one direction by bodily movement of the camera toward the user's forehead while the user is viewing the subject through the range finder, said means being connected with the range finder and lens for simultaneously adjusting the focus of the lens and the setting of the range finder whereby the fingers are left free for grasping the camera and operating the shutter release, and means for moving said forehead engaging means in the opposite direction.

5. In a camera, the combination of a focusing lens, a coupled range finder, a rearwardly projecting member mounted on the camera, and movable with respect thereto for engagement with the user's head while the user is viewing the subject through the range finder, spring means opposing the movement of said rearwardly projecting member, said member being connected with the range finder and lens and cooperating with said spring means, for simultaneously moving the lens with reference to the film in the camera and for varying the setting of the range finder whereby the fingers are left free for grasping the camera and operating the shutter release.

6. An attachment for a camera having a focusing lens and coupled range finder, said attachment comprising a unitary assembly of a body engaging member to project rearwardly of the camera and being movable relatively thereto and adapted to engage the user's body as the scene is viewed through the range finder, a spring opposing movement of said body engaging member, means for securing the member and spring to the camera and means for connecting the member to the lens for focusing the lens as the user moves the camera to adjust the coupled range finder.

7. An attachment for a camera having a focusing lens and coupled range finder moved by focusing of the lens, said attachment including in combination in a unitary assembly a spring biased operating bar to be mounted on and movable relatively to the camera, and to be engaged with a portion of the user's body as he views the scene through the range finder, drum means operated thereby, and a flexible connection to connect the drum means and lens for moving the lens and range finder by movement of the operating bar.

ELMER H. SETTEL.
VITALIS HIMMER.